(12) United States Patent
Chandra et al.

(10) Patent No.: US 10,218,709 B2
(45) Date of Patent: Feb. 26, 2019

(54) SHARE PERMISSIONS AND ORGANIZATION OF CONTENT IN AN APPLICATION WITH MULTIPLE LEVELS OF ORGANIZATIONAL HIERARCHY

(71) Applicant: Microsoft Technology Licensing, LLC, Redmond, WA (US)

(72) Inventors: Omeed Chandra, Redmond, WA (US); Ginger Fang, Redmond, WA (US); Lisa Cherian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 15/067,228

(22) Filed: Mar. 11, 2016

(65) Prior Publication Data

US 2017/0264618 A1    Sep. 14, 2017

(51) Int. Cl.
  *H04L 29/06*  (2006.01)
  *H04L 29/08*  (2006.01)

(52) U.S. Cl.
  CPC .......... *H04L 63/105* (2013.01); *H04L 63/102* (2013.01); *H04L 67/10* (2013.01)

(58) Field of Classification Search
  CPC ..... H04L 63/102; H04L 63/105; H04L 67/10; G06F 3/0484; G06F 17/30165; G06Q 10/10
  USPC ...................................................... 726/26–27
  See application file for complete search history.

(56) References Cited

U.S. PATENT DOCUMENTS

| | | | |
|---|---|---|---|
| 5,388,196 A * | 2/1995 | Pajak ............... | G06F 17/30011 707/E17.008 |
| 5,678,040 A * | 10/1997 | Vasudevan ............. | G06F 17/50 |
| 7,707,518 B2 | 4/2010 | Veselova | |
| 8,612,845 B2 | 12/2013 | Nelson et al. | |
| 2004/0254884 A1* | 12/2004 | Haber .................... | G06Q 10/10 705/51 |
| 2005/0065913 A1* | 3/2005 | Lillie ................ | G06F 17/30873 |
| 2006/0080316 A1* | 4/2006 | Gilmore ........... | G06F 17/30864 |
| 2006/0161516 A1* | 7/2006 | Clarke .............. | G06F 17/30578 |
| 2006/0286536 A1* | 12/2006 | Mohler .................... | G09B 5/00 434/350 |
| 2007/0266011 A1 | 11/2007 | Rohrs et al. | |
| 2009/0307604 A1* | 12/2009 | Giles .................... | G06F 21/604 715/751 |

(Continued)

OTHER PUBLICATIONS

Mundhra, Ashish, "Reviewing Zoho Notebook, a Multi-Functional Online Note Taking Tool", Published on: Oct. 2, 2011 Available at: http://www.guidingtech.com/8256/zoho-notebook-review-multi-functional-online-note-taking-tool/.

(Continued)

*Primary Examiner* — Shanto Abedin
(74) *Attorney, Agent, or Firm* — Talem IP Law, LLP

(57) ABSTRACT

Share permissions and organization of content in an application with multiple levels of organizational hierarchy is provided. In some examples, an application (or a hosted service) may provide content generation and processing capability for different types of content. Content may be organized in hierarchical levels and users may be enabled to share different levels of content with other users, see the sharing status, define/manage sharing parameters for different levels and perform actions on shared content such as copying, moving, creating, editing, etc.

17 Claims, 10 Drawing Sheets

(56) References Cited

U.S. PATENT DOCUMENTS

| | | | |
|---|---|---|---|
| 2010/0235881 A1* | 9/2010 | Liu | G06F 21/6218 726/3 |
| 2012/0041922 A1* | 2/2012 | Vainer | G06F 17/3089 707/608 |
| 2014/0019562 A1* | 1/2014 | Le Chevalier | G06F 17/30014 709/206 |
| 2014/0067702 A1* | 3/2014 | Rathod | G06Q 10/10 705/319 |
| 2014/0351716 A1* | 11/2014 | Steinbok | G06F 3/0484 715/753 |
| 2016/0070926 A1* | 3/2016 | Kalb | G06F 21/10 705/39 |

OTHER PUBLICATIONS

Ellis, Robert, "NoteBook 1.2", Published on: Jun. 8, 2012 Available at: http://www.macworld.com/article/1040083/notebook.html.

Nelson, et al., "Keyholes: Selective Sharing in Close Collaboration", In Proceedings of Extended Abstracts on Human Factors in Computing Systems, Apr. 5, 2008, pp. 2443-2452.

Nesic, et al., "Towards Efficient Document Content Sharing in Social Networks", In Proceedings of Second International Workshop on Social Software Engineering and Applications, Aug. 24, 2009, pp. 1-8.

Kaufman, Lori, "The Best Apps and Cloud Services for Taking, Storing, and Sharing Notes", Published on: May 26, 2012 Available at: http://www.howtogeek.com/114794/the-best-apps-and-cloud-services-for-taking-storing-and-sharing-notes/.

"How can we improve OneNote for Windows?", Retrieved on: Dec. 24, 2015 Available at: https://onenote.uservoice.com/forums/327186-onenote-for-windows-windows-phone/suggestions/6159650-ability-to-share-individual-sections-or-pages-ins.

"Share and Sync Notebooks in OneNote for Windows 8", Retrieved on: Dec. 24, 2015 Available at: https://support.office.com/en-in/article/Share-and-sync-notebooks-in-OneNote-for-Windows-8-bdcbd49e-bd78-44d3-ae15-f3d994529034.

"OneNote Notebook: Creating Private Spaces", Published on: Mar. 16, 2015 Available at: http://webster.net.nz/2015/03/onenote-notebooks-creating-private-spaces/.

\* cited by examiner

SHARE PERMISSIONS AND ORGANIZATION OF CONTENT IN AN APPLICATION WITH MULTIPLE LEVELS OF ORGANIZATIONAL HIERARCHY

BACKGROUND

People create and edit content of various types in daily work and personal lives. While a broad spectrum of content specific applications enable people to process content in various forms such as documents, increasingly different types of content (for example, word processing documents, notes, emails, spreadsheets, etc.) can be combined in a single container or integrated into each other. OneNote® from Microsoft Corporation of Redmond, Wash. is one example application that allows users to bring together various forms of content, organize, and process.

Another aspect of computing increasingly becoming part of daily work and personal lives is sharing. People share and collaborate on documents, projects, and other items through a variety of methods. Documents or links may be emailed to others, collaborators may have direct access to documents (or other content), etc. Conventional applications and systems, however, typically allow sharing of individual documents, folders that contain documents, or folder structures that contain other folders. Thus, sharing is limited in certain aspects.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing share permissions and organizing content in an application with multiple levels of organizational hierarchy. A user interface may be provided that enables a user to organize containers of content based on one or more of user-defined and default categories, where levels of containers may include notebooks, sections, and pages. The user may be allowed to create and/or edit portions of content. Upon receiving a request to share a portion of the content from the user, sharing of the portion of the content with another user may be enabled regardless of a level of container that contains the portion of the content within the organizational hierarchy. Sharing permissions associated with the portion of the content may be distinct from sharing permissions of a higher level container that includes the portion of the content. A sharing status of the portions of content may also be provided to the user and another sharing status of the shared portion of content may be provided to the other user in form of share vectors that represent sharing status for shared levels of containers over time.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
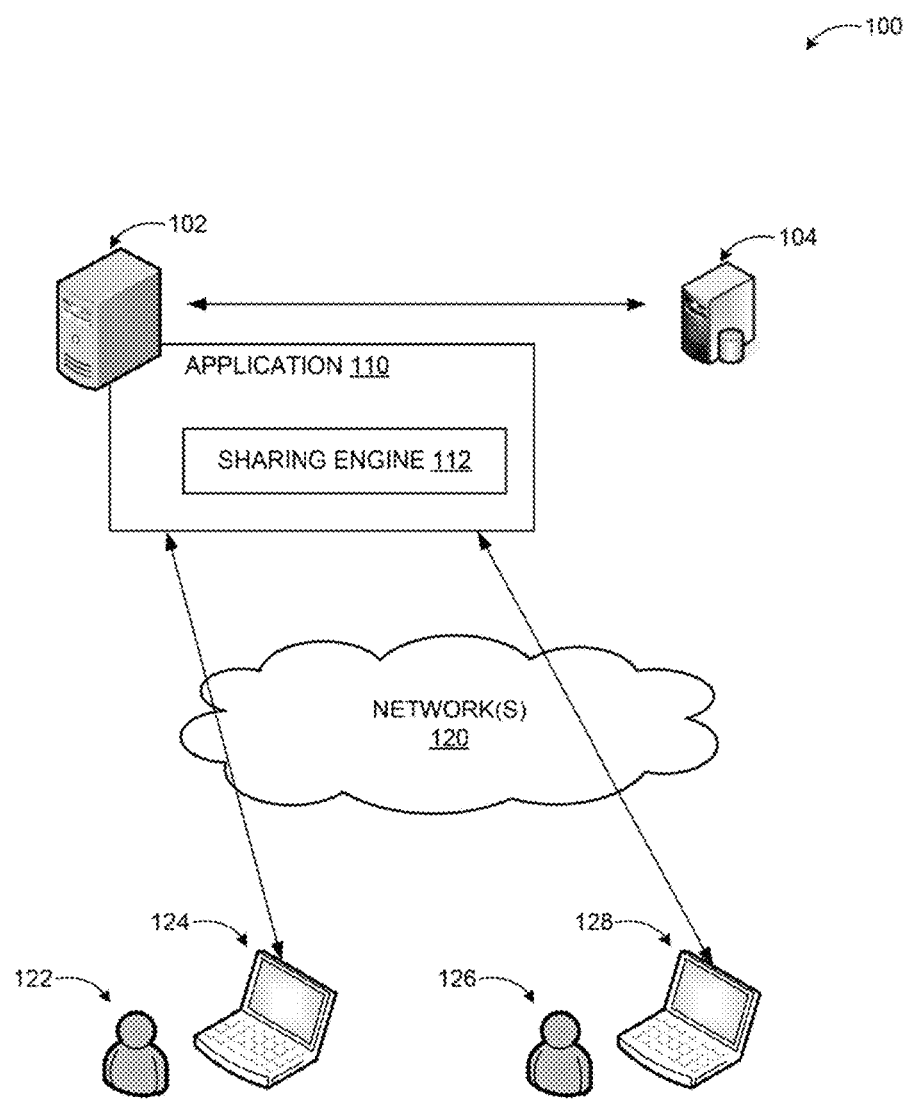
FIG. 1 is a conceptual display diagram illustrating an example computing environment for providing share permissions and organizing content in an application with multiple levels of organizational hierarchy, according to embodiments.

As briefly described above, embodiments are directed to providing share permissions and organization of content in an application with multiple levels or organizational hierarchy. In some examples, an application (or a hosted service) may provide content generation and processing capability for different types of content. Content may be organized in hierarchical levels and users may be enabled to share different levels of content with other users, see the sharing status, define/manage sharing parameters for different levels, and perform actions on shared content such as copying, moving, creating, editing, etc.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the an will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing share permissions and organization of content in an application with multiple levels of organizational hierarchy. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using notebook applications herein, embodiments are not limited to a notebook application. As discussed previously, different types of content (in form of documents or other structured data) may be integrated within one type of application (for example, a spreadsheet application including word processing documents, presentation documents, and other content inserted within a spreadsheet), or a separate application may combine content from a variety of applications and allow hierarchical organization of such data. Different types of content may include, but are not limited to, word processing documents, spreadsheets, notes, emails, other forms of communication recordings, presentations, graphics, images, audio data, video data, and comparable ones. Furthermore, an organizational structure of an application according to embodiments are not limited to the examples discussed herein. Content may be structured in different forms of hierarchical structures within the containers used by the application.

The technical advantages of providing share permissions and organization of content in an application with multiple levels of organizational hierarchy may include, among others, increased security and efficiency in networked collaboration. Additionally, processing and network bandwidth usage may be reduced by allowing subsets of content to be shared instead of entire documents, notebooks, or folders. User interaction in content sharing and collaboration may be improved by allowing the users to share and receive focused and specific content in a friendly format. Additionally, displaying the share status of content may allow enhanced interaction with created or edited content when compared to interactions associated with conventional sharing approaches, as conventional sharing methods may merely allow sharing of individual and entire documents, not portions of such.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with communications.

FIG. 1 is a conceptual display diagram illustrating an example computing environment for providing share permissions and organizing content in an application with multiple levels of organizational hierarchy, according to embodiments.

As shown in a diagram 100, a server 102 may execute an application 110 (or a hosted service) that provides the capability to create and edit content. The application 110 may also include a sharing engine 112, which may enable sharing of created or edited content among users 122, 126, etc. Created or edited content may be stored in one or more data stores (for example, local data stores in users' computing devices, cloud storage, and so on), some of which may be managed by a database server 104. The content and associated data may be managed by multiple servers. Similarly, the application 110 (or hosted service) may be executed on multiple servers too.

Users 122 and 126 may access the application 110 through their respective computing devices 124 and 128 over one or more networks 120. The networks 120 may provide wired or wireless communications between nodes, such as the computing devices 124, 128 or the servers 102, 104. In some embodiments, the application 110 may also be locally executed on a user's computing device. To process the content and enable sharing of the content, the application 110 may provide a user experience to the users 122 and 126. The user experience may be a visual display through which the users 122 and 126 may interact with the application 110. The interactions may include a touch input, a gesture input, a voice command, eye tracking, a gyroscopic input, a pen input, mouse input, and/or a keyboards input, among others. As discussed in further detail below, the user experience may provide visual indications of sharing status of content such as documents, portions of documents, collations of documents, etc.

The computing devices 124 and 128 may each include a display device, such as a touch enabled display component, and a monitor, among others, to provide access to the application 110 for the users 122 and 126 through a web browser (thin client) or a local client application (thick client). The computing devices 122 and 126 may include a desktop computer, a laptop computer, a tablet, a handheld device, a vehicle mount computer, an embedded computer system, a smart phone, and a wearable computer, among other computing devices, for example.

While the example system in FIG. 1 has been described with specific components including the server 102, the database server 104, application 110, the sharing engine 112, embodiments are not limited to these components or system configurations and can be implemented with other system configuration employing fewer or additional components.

Figure 2:
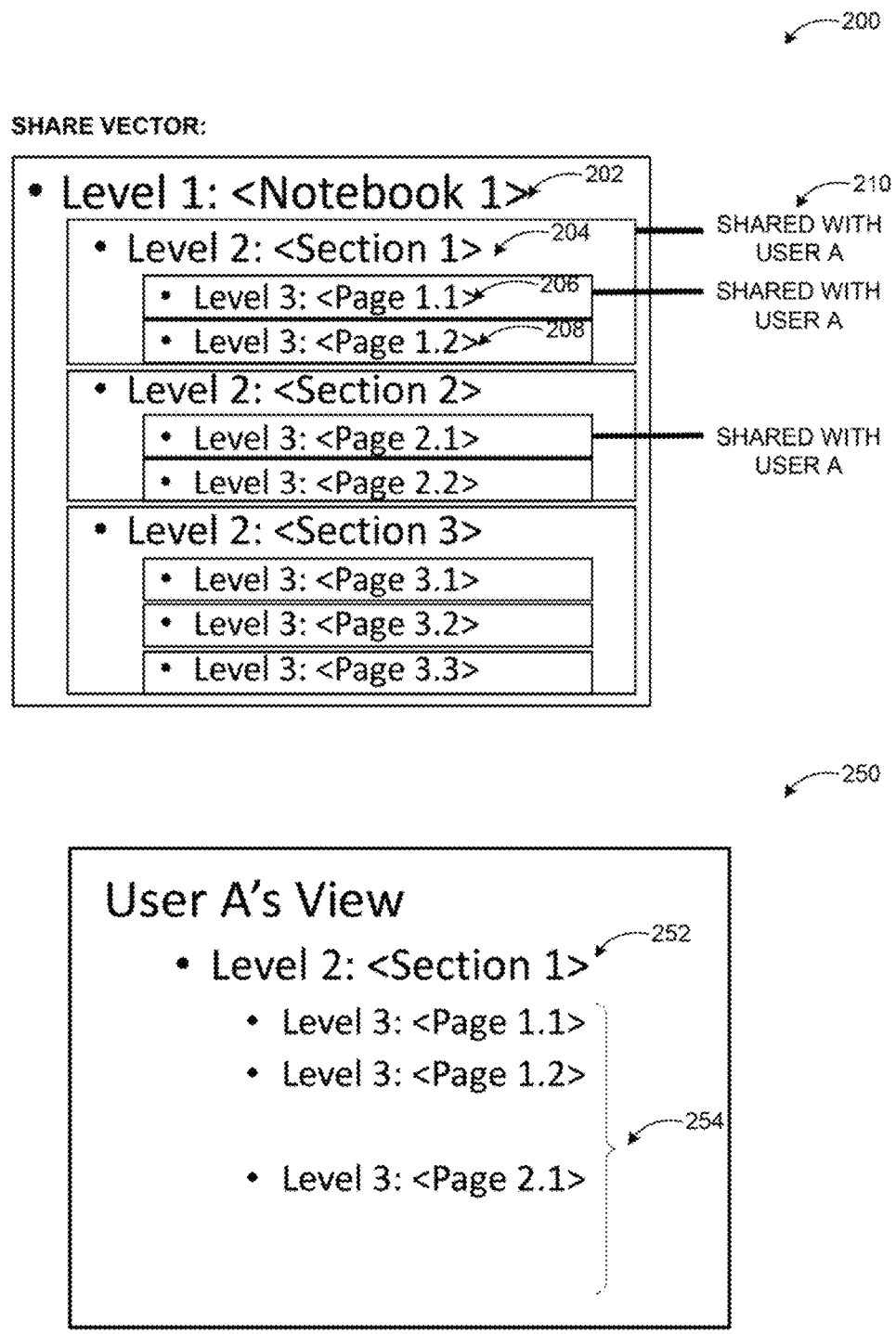
FIG. 2 is a display diagram illustrating example share vectors representing shared content, according to embodiments.

FIG. 2 is a display diagram illustrating example share vectors representing shared content, according to embodiments.

As mentioned above, users may create and edit content that may be combined with other forms of content. For example, a notebook application may provide containers for word processing documents, spreadsheets, presentations, emails, other forms of communication, notes, and other content based on user-defined categories, such as projects, interests, etc. A user may organize the container(s) of content in any organizational hierarchy that may suit their needs such as notebooks, sections, section groups, pages, etc. Each piece of content (e.g., document) may also have subsections such as multiple pages, contextual sections, paragraphs, etc. In conventional systems, users may share one piece of content (e.g., a document) or a collection of documents such as a folder, but not at a granular level. Furthermore, different levels of the same content hierarchy may not be shared with different users.

According to some embodiments, users may be enabled to share any level of the organizational hierarchy of the content with any user (and any sharing permission settings). The sharing may be represented through share vectors such as share vector 200 in FIG. 2. The share vector 200 represents organizational hierarchy its levels 1 and 2 (202, 204). The level 2 content may include sections such as section 1, section 2, etc. A further organizational hierarchy level may include level 3 (206), which may represent pages (e.g., page 1.2 208) in the notebook. The share vector 200 further shows indication of which organizational hierarchy components (i.e., levels) are shared with which user (210). The sharing status may be visually indicated through a variety of textual, graphic, and other schemes such as shading, coloring, highlighting, etc.

Share vector 250 is a representation of what user A (the recipient of shared content) may see. Because user A has access to a subset of the contents of the notebook such as level 1 (202), only those accessible levels of the organizational hierarchy of the content may be displayed to the user A such as level (252) and select portions of levels 3 (254).

When content is shared over time, the share vectors may be displayed rather than a de-duplicated view of what has been shared. A "cleaner" de-duplicated view may cause users to perceive content as disappearing.

Once a user can share a sub-unit (such as a page) or a larger unit (such as a section or notebook), the user may get into a state where both the sub-unit and the larger unit are shared with the user. In a de-duplicated view, the sub-unit ma be shown only once. Without a de-duplicated view, the sub-unit may be shown twice (both as an individual item and as a member of the larger unit). For example, considering the following scenario, where user 1 shares the page "Banana Bread Recipe" (which may be contained in her notebook "User 1's Notebook") with user 2. The result may be that the user 2 can now see Banana Bread Recipe in notebook application in the list of individual pages that have been shared with him. User 1 may share her entire notebook "User 1's Notebook" with the user 2. The result in de-duplicated view may be that the user 2 can see the page Banana Bread Recipe as part of User 1's Notebook, but no longer see Banana Bread Recipe in the list of individual pages that have been shared with him. The result without de-duplicated view may be that the user 2 can see the pane Banana Bread Recipe listed in two places—as part of User 1's Notebook, and in the list of individual pages that have been shared with him. The de-duplicated view may be more confusing for users in practical implementations, because items may disappear and reappear in the list of individual pages shared with the user based on whether the containing unit is shared, which users may find unpredictable.

Figure 3A:
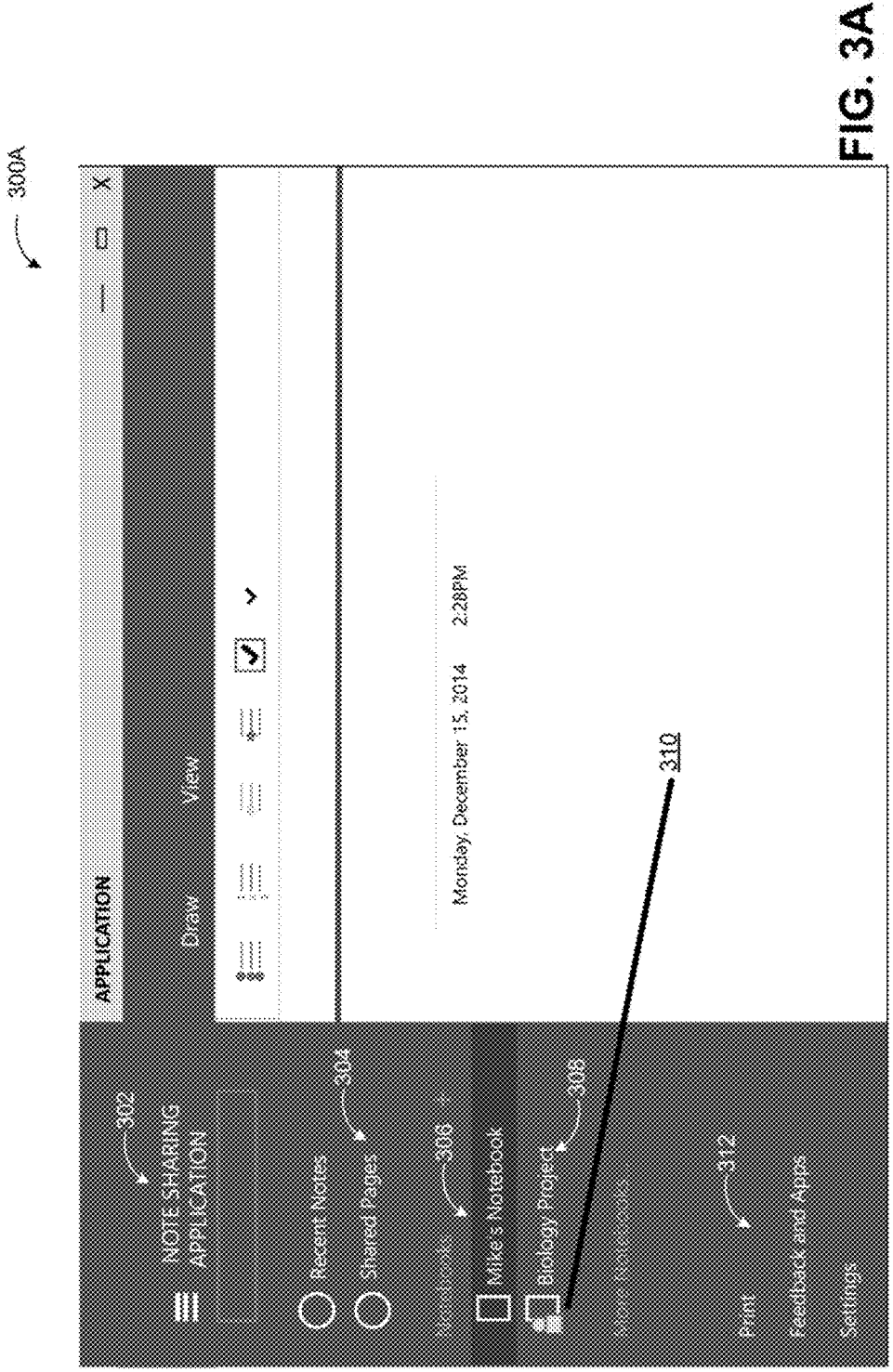
FIGS. 3A and 3B are display diagrams illustrating example visual it of shared content in a notebook application environment, according to embodiments.
Figure 3B:
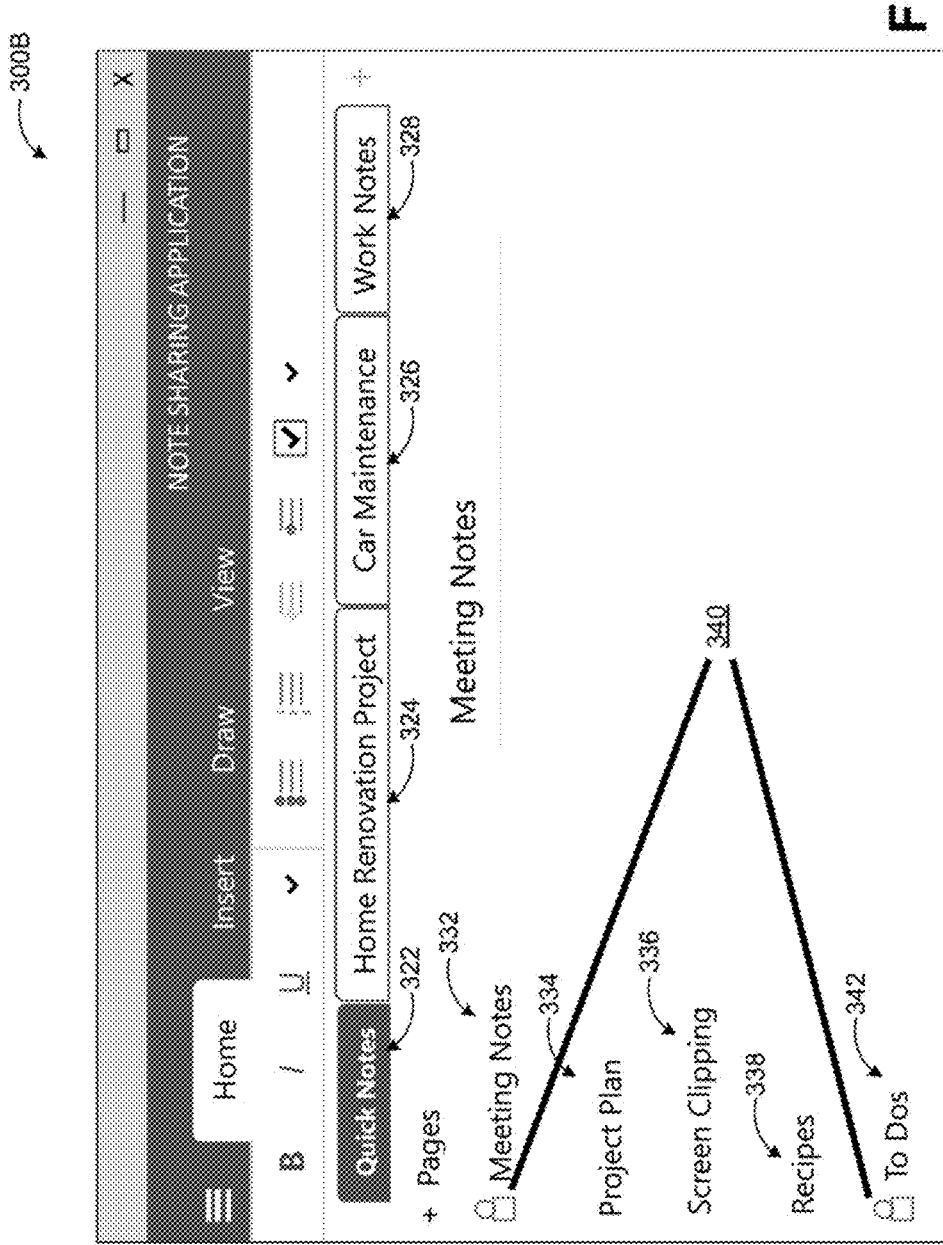

FIGS. 3A and 3B are display diagrams illustrating example visual indications of shared content in a notebook application environment, according to embodiments.

Display diagram 300A of FIG. 3A is a user interface of a note sharing application 302. Note sharing application 302 may enable collection of different types of content within notebooks and sharing among collaborators. Users may share any level of organizational hierarchy, much as an entire notebook, an entire section, or a page according to some embodiments. Further, users may share multiple levels, and even levels contained within other levels. For example, a user may share a notebook with user A and within that notebook, a section with user B. With this capability, users may manage sharing permissions for any level, know what is shared with whom, see an appropriate view of what is shared with them, and perform actions on shared content, such as copy/move/file/create new content.

The user interface of the note sharing application 302 displays to the user available hierarchies of organized content (e.g., Mike's Notebook 306, Biology Project 308) controls 312 for performing actions on the available content, and a Shared Pages control 304 to display a list of shared content. In addition, graphic or other forms of indicators such as indicator 310 may be used to show which level(s) of a document (content) are shared, whom they are shared with, and how they are shared. For example, upon clicking on or hovering over the indicator 310, the user may see a pop-up display that shows detail levels of the document that are shared, the users with whom those levels are shared, and sharing permissions given to those users (e.g., read-only, edit, copy, save, etc.).

Display diagram 300B of FIG. 3B shows another user interface of a note sharing application, where contents of a notebook are categorized as sections Quick Notes 322, Home Renovation Project 324, Car Maintenance 326, and Work Notes 328. Each section may include multiple levels of other content such as panes 332, 334, 336, 338, and 342.

The pages may be collection of documents or other content categorized under a common theme. Thus, each page may include different types of content. In an application according to embodiments, sections, pages, or even content within the pages may be shared with different users. Indicators 340 displayed in conjunction with panes 332 and 342 may provide information associated with sharing status of those pages to a user.

User interfaces like the ones discussed herein may provide users views of content shared with others or content shared by others with a user, and the users may create a shared pane from those views. If an item that is being shared has defined permissions, a copy of the item made by the recipient of sharing action may be created with the same permissions. If the item does hot have defined permissions, the copy of the shared item may be created as a private copy. In other embodiments, if an item (e.g., a page) is moved from a larger container (e.g., section), the item may inherit permissions of the new container or maintain the permissions it had in the previous container depending on the configuration settings.

In further embodiments, a user may be enabled to create a larger shared container from a shared item. For example, a user may receive a shared page and create a new shared notebook with same sharing parameters from that page. Further, standalone items (e.g., pages) received by a share recipient may be filed into a different container without inheriting the destination container's permissions. Thus, the user may be able to organize content any way a user wants, even if the content is shared.

Figure 4A:
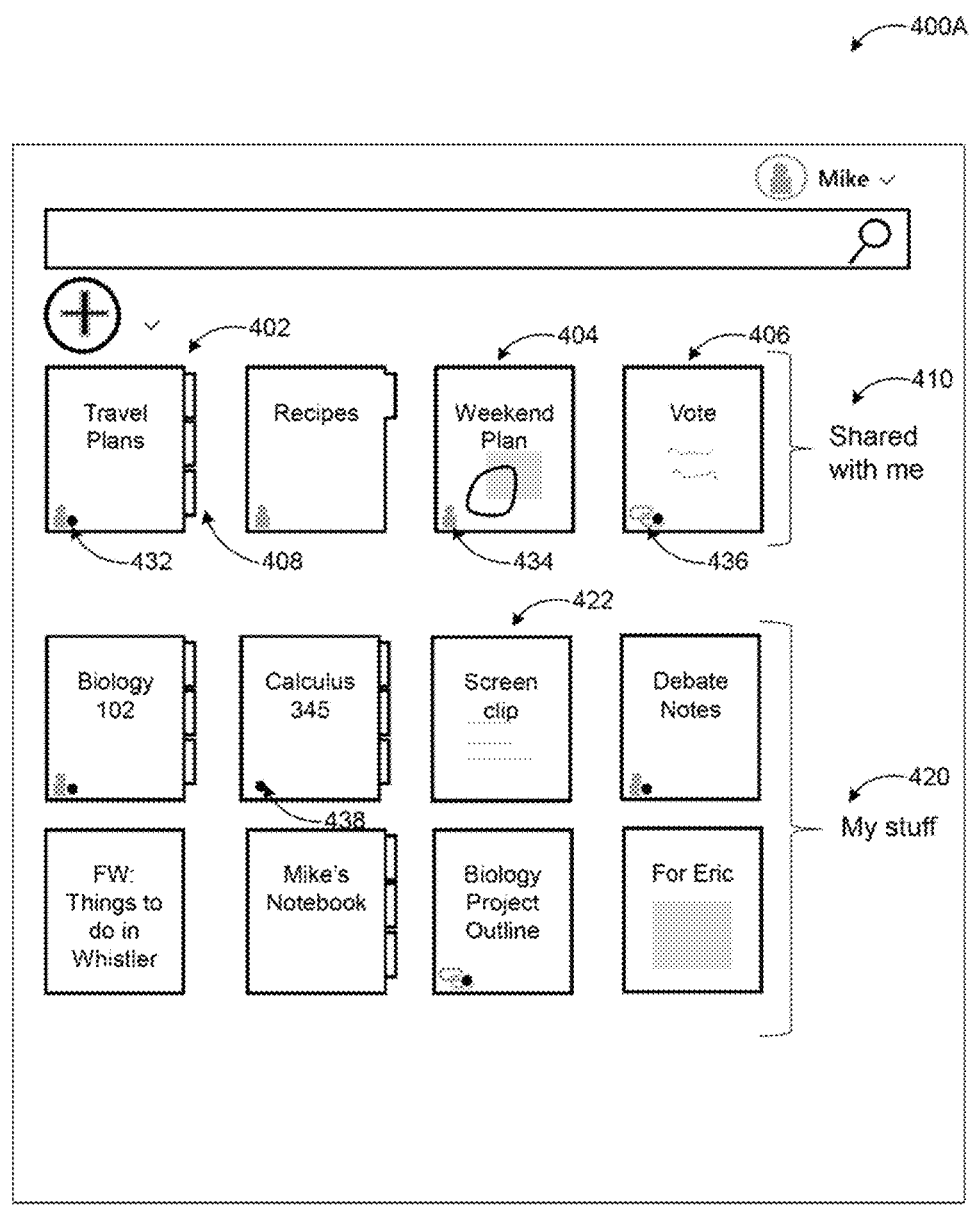
FIGS. 4A and 4B are display diagrams illustrating alternative visual indications of shared content and sharing actions in a notebook environment, according to embodiments.
Figure 4B:
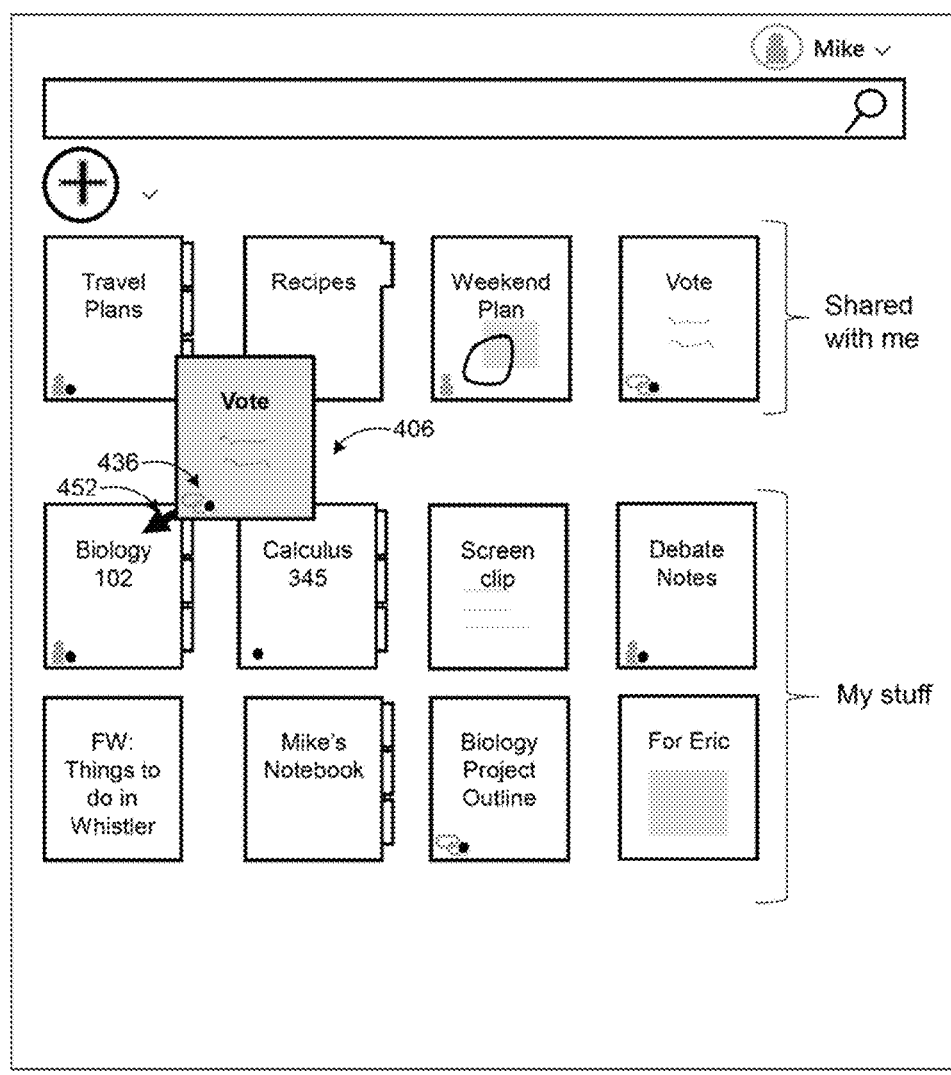

FIGS. 4A and 4B are display diagrams illustrating alternative visual indications of shared content and sharing actions in a notebook environment, according to embodiments.

Display diagram 400A of FIG. 4 shows a different representation of multiple levels of hierarchically organized content. Folder or notebook like icons may represent containers of content categorized according to groups defined by the user. For example, a notebook called Travel Plans 402 may include content associated with the user's travel plans. Tabs 408 attached to the icon may indicate additional levels (e.g., sections or pages) within the notebook. The containers are further grouped by two other categories defined by the user "Shared with me" category 410 and "My stuff" category 420. For example, the "Shared with me" category 410 includes the notebooks Travel Plans 402, Weekend Plan 404, and Vote 406. The latter two do not have additional levels of content within themselves.

Sharing status of the notebooks and additional levels (if any) within each notebook may be displayed through indicators 432, 434, 436, and 438. Different indicators may represent different information such as the entire notebook being shared, levels within the notebook being shared, who the content is shared with, sharing permissions, sharing history, and other relevant information.

Display diagram 400B of FIG. 4B shows how a user can move a container or standalone content (e.g., a page) to another container through the user interface that displays the shared (and not shared) content. As shown in the diagram, a user may be enabled to move content such as the page Vote 406 to the notebook Biology 102 (452), for example, by dragging the page. Sharing permissions of the moved content (436) and the destination container may be different. The permissions after the move may be retained or inherit the permissions of the container as discussed previously. Moreover, a user may be enabled to remove a shared page from a view. A view may be provided in the application, which includes shared content, where the user may still see the shared entity.

Figure 5:
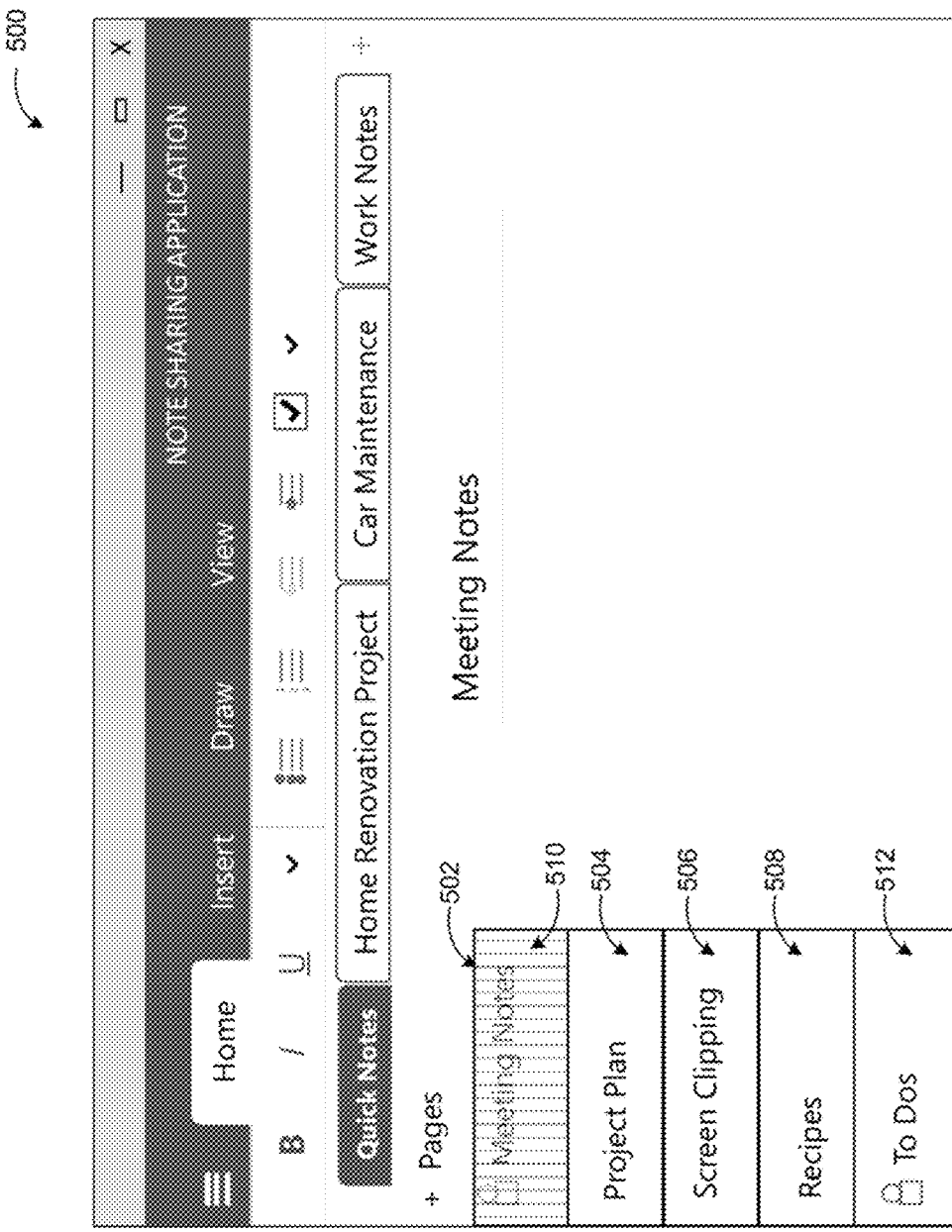
FIG. 5 is a display diagram illustrating example visual indication of share status of content levels in a multi-level notebook environment, according to embodiments.

FIG. 5 is a display diagram illustrating example visual indication of share status of content levels in a multi-level notebook environment, according to embodiments.

Display diagram 500 show a user interface of the note sharing application of FIGS. 3A and 3B with the sections 502, 504, 506, 508, and 512 of a notebook called Quick Notes. In addition to the icons indicating sharing status of the contents of sections 502 and 512, shading 510, color, or a similar scheme may be used to indicate that the share permissions for a container may not inherit the share permissions of the higher level container. For example, the shading 510 of section 502 (Meeting Notes) may indicate that the sharing permissions for that section are different from the overall sharing permissions of the notebook Quick Notes.

Figure 6:
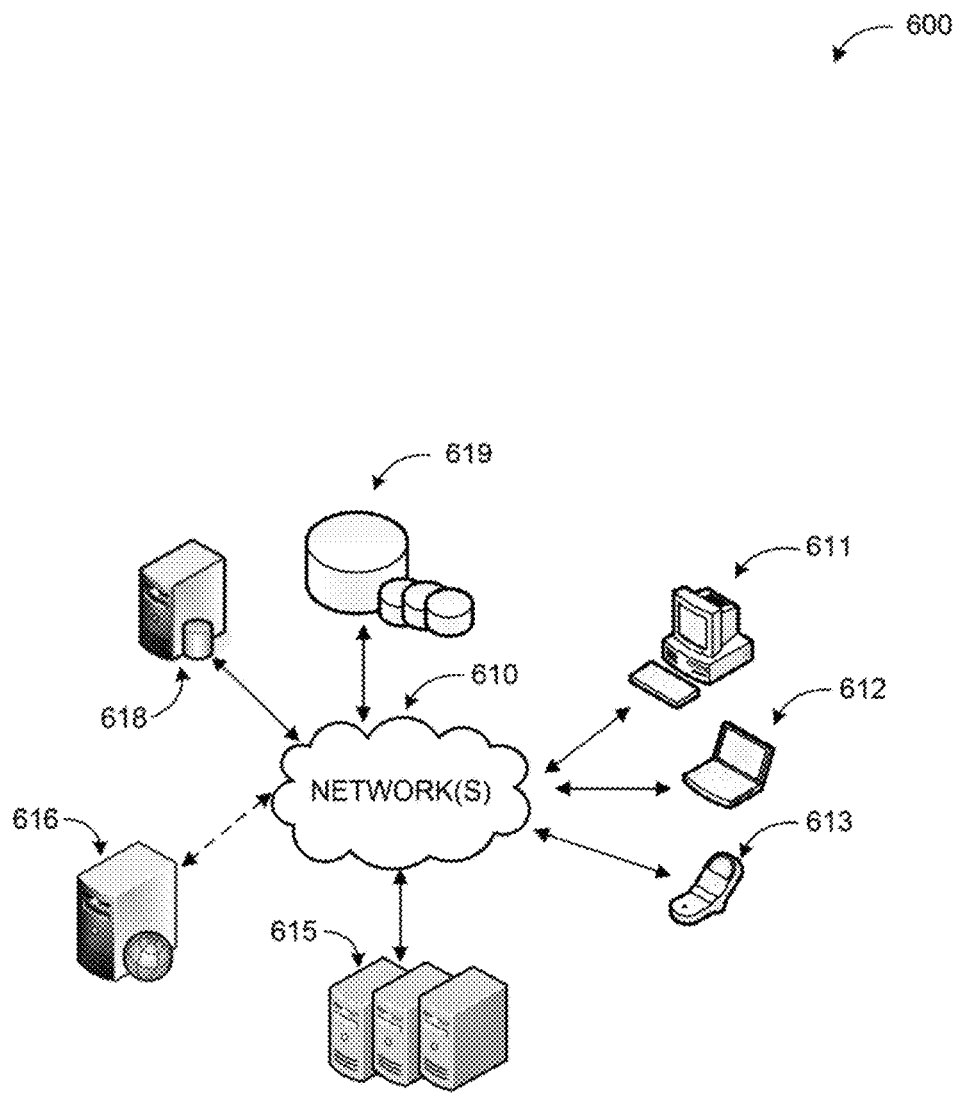
FIG. 6 is a simplified networked environment, where a system according to embodiments may be implemented.

FIG. 6 is a simplified networked environment, where a system according to embodiments may be implemented.

As shown in a diagram 600, an application or a service providing share permissions and organization of content with multiple levels of organizational hierarchy may be implemented in a networked environment over one or more networks, such as a network 610. Participants may access the application or service through locally installed or thin (e.g., browser) client applications executed on a variety of computing devices 611-613, such as a smart phone 613, a mobile computer 612, or a desktop computer 611 ('client devices'). The application (or service) may provide content generation and processing capability for different types of content. Content may be organized in hierarchical levels and users may be enabled to share different levels of content with other users, see the sharing status, define/manage sharing parameters for different levels, and perform actions on shared content such as copying, moving, creating, editing, etc.

An application or service, as discussed herein, may be implemented via software executed over servers 615. The servers 615 may include one or more web servers 616, where at least one of the one or more web servers 616 may be configured to provide access to the application or service through web communications. In other examples, the application or service may be provided by a third party service or may include a web application. The application or service may store data associated with searches in a data store 619 directly or through a database server 618.

A computing device may communicate with the server over a network 610. The network 610 may comprise any topology of servers, clients, Internet service providers, and communication media. A system according to embodiments may have a static or dynamic topology. The network 610 may include multiple secure networks, such as an enterprise network, an unsecure network, or the Internet. The unsecure network may include a wireless open network. The network 610 may also coordinate communication over other networks, such as Public Switched Telephone Network (PSTN) or cellular networks. Furthermore, the network 610 may include multiple short-range wireless networks, such as Bluetooth, or similar ones. The network 610 may provide communication between the nodes described herein. By way of example, and not limitation, the network 610 may include wireless media. The wireless media may include, among others, acoustic media, RF media, infrared media, and other wireless media.

A textual scheme, a graphical scheme, an audio scheme, an animation scheme, a coloring scheme, a highlighting scheme, and/or a shading scheme may be employed to distinguish sharing status and share permissions among different containers of content.

Many other configurations of computing devices, applications, data sources, and data distribution systems may be employed for providing share permissions and organization of content in an application with multiple levels of organizational hierarchy. Furthermore, the networked environments discussed in FIG. 6 are for illustration purposes only. Embodiments are not limited to the example applications, modules, or processes.

Figure 7:
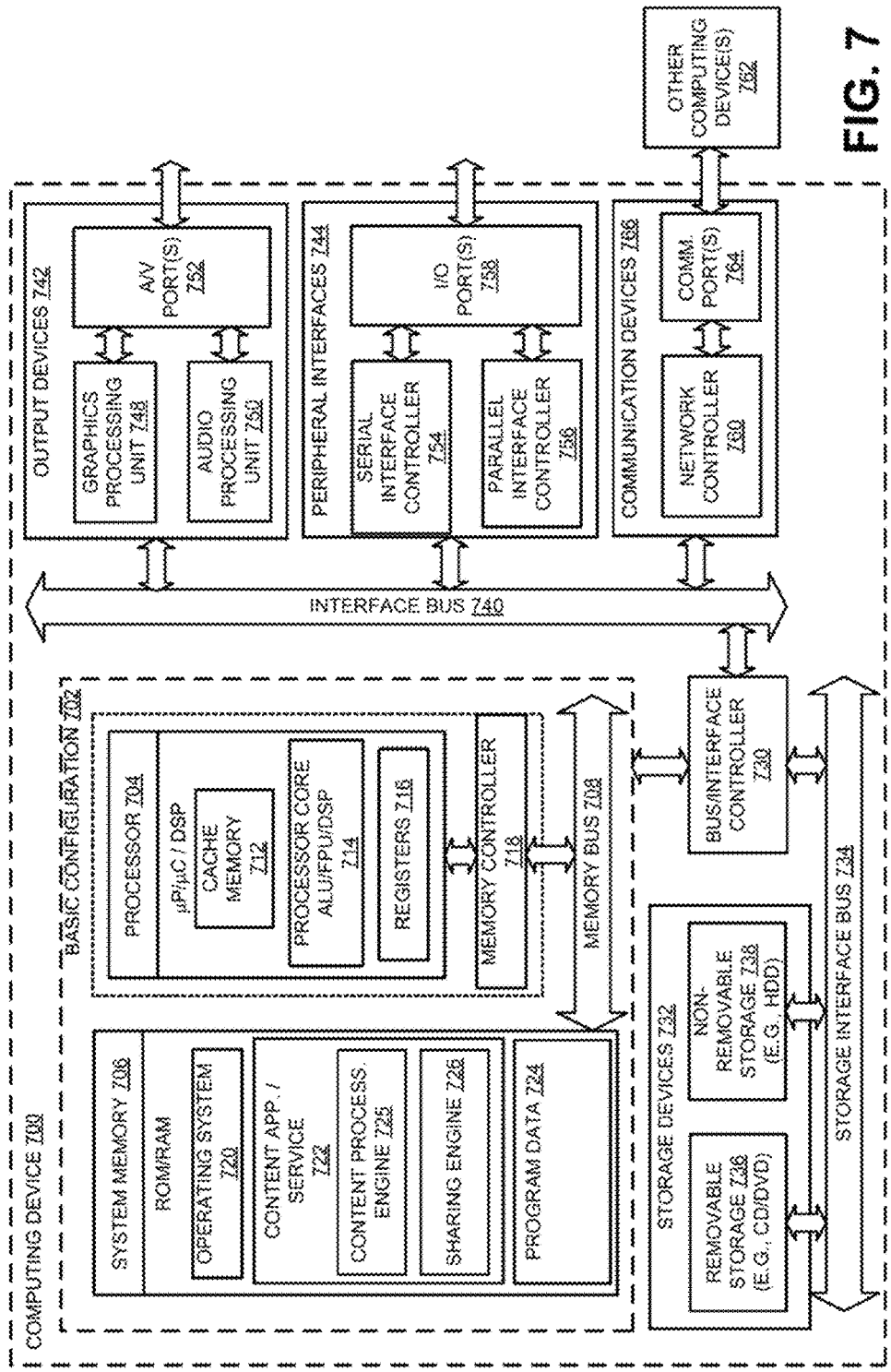
FIG. 7 is a block diagram of an example computing device, which may be used for providing share permissions and organizing content in an application with multiple levels of organizational hierarchy, according to embodiments.

FIG. 7 is a block diagram of an example computing device, which may be used for providing share permissions and organizing content in an application with multiple levels of organizational hierarchy, according to embodiments.

For example, a computing device 700 may be used as a server, desktop computer, portable computer, smart phone, special purpose, computer, or similar device. In art example basic configuration 702, the computing device 700 may include one or more processors 704 and a system memory 706. A memory bus 708 may be used for communication between the processor 704 and the system memory 706. The example basic configuration 702 may be illustrated in FIG. 5 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The one or more processor cores 714 may (each) include an arithmetic logic unit (ALU), a floating point unit (FPU), a digital signal processing core (DSP Core), or any combination thereof. An example memory controller 718 may also be used with the processor 704, or in some implementations, the example memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a content application or service 722, and a program data 624. The application or service 722 may include a content processing engine 725 and a sharing engine 726. The content processing module 725 may enable a user to create and/or edit content, where portions of the content are hierarchically organized in containers. The sharing engine 726 may be configured to provide sharing of different levels of content among users, display the sharing status, allow users to define/manage sharing parameters for different levels, and perform actions on shared content such as copying, moving, creating, editing, etc.

The computing device 700 may have additional features or functionality, and additional interfaces to facilitate communications between the example basic configuration 702 and any desired devices and interfaces. For example, a bus/interface controller 730 may be used to facilitate communications between the example basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the example basic configuration 702 via the bus/interface controller 730. Some of the one or more output devices 742 include a graphics processing unit 748 and an audio processing unit 750, which may be configured to communicate to various external devices such as a display or speakers via one or more A/V ports 752. The one or more peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods for providing share permissions and organizing content in an application with multiple levels of organizational hierarchy. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
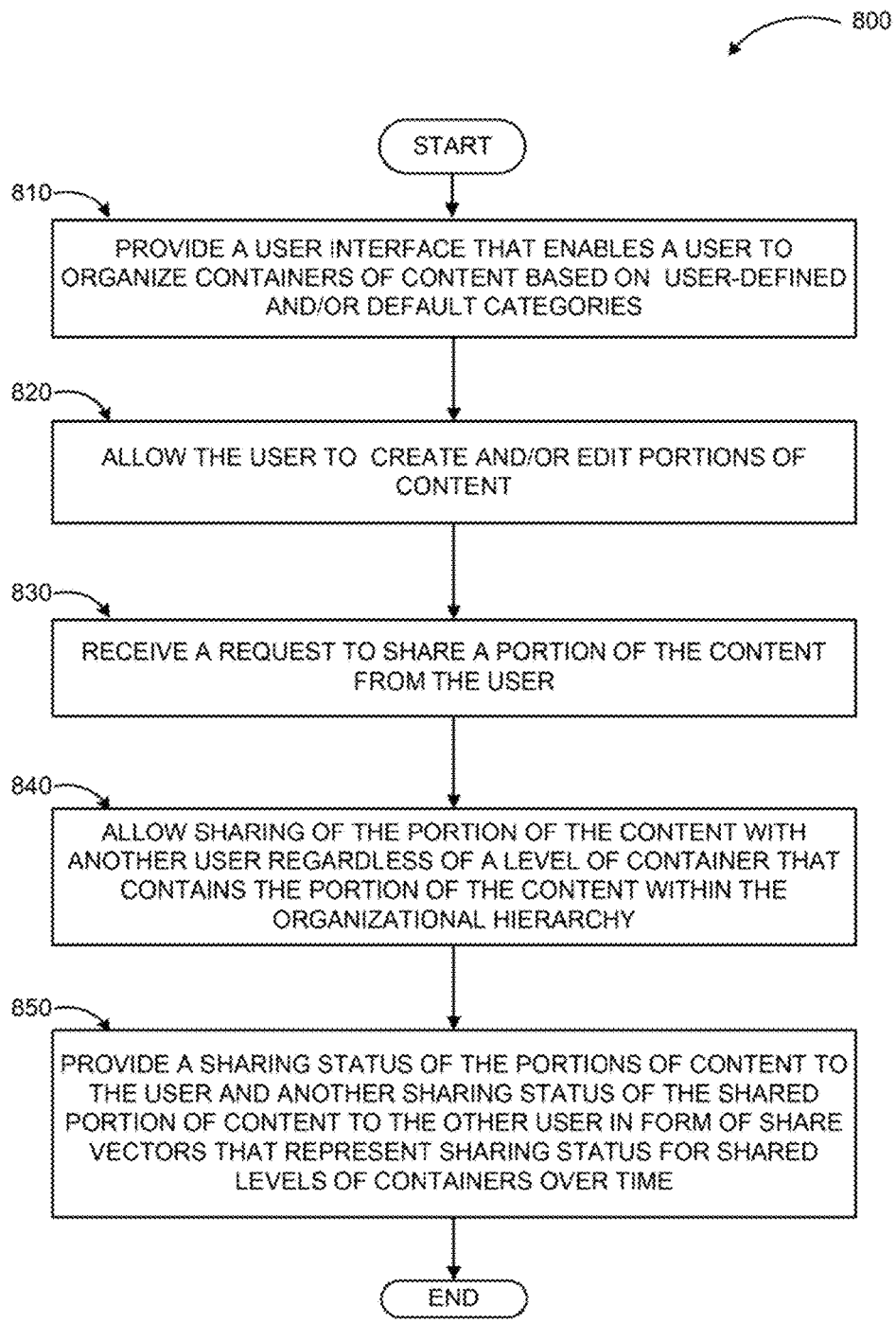
FIG. 8 is a logic flow diagram illustrating a process for providing share permissions and organizing content in an application with multiple levels of organizational hierarchy, according to embodiments.

FIG. 8 is a logic flow diagram illustrating a process for providing share permissions and organizing content in an application with multiple levels of organizational hierarchy, according to embodiments.

A process 800 may be implemented on a server. As described, the server may provide content creation and editing functionality along with sharing capability. The process 800 may begin with operation 810, where the content service may provide a user interface that enables a user to organize containers of content based on one or more of user-defined and default categories. In a notebook environment, for example, levels of containers may include notebooks, sections, and pages, each of which may include one or more of a word processing document, a spreadsheet, a presentation document, an email, a text message, a graphic file, an ink entry, an audio file, a video file, and a communication recording.

At operation 820, the content service may allow the user to create and/or edit portions of content. At operation 830, a request may be received from the user to share a portion of the content. At operation 840, a sharing module of the content service may allow sharing of the portion of the content with another user regardless of a level of container that contains the portion of the content within the organizational hierarchy. One or more sharing permissions associated with the portion of the content may be distinct from one or more sharing permissions of a higher level container that includes the portion of the content.

At operation 850, the sharing module may provide a sharing status of the portions of content to the user and another sharing status of the shared portion of content to the other user in form of share vectors that represent sharing status for shared levels of containers over time.

The operations included in process 800 are for illustration purposes. Providing share permissions and organizing content in an application with multiple levels of organizational hierarchy may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a server to provide share permissions and organization of content with multiple levels of organizational hierarchy may be described. The server may include a memory configured to store instructions and a processor coupled to the memory, the processor configured to execute a content service. The content service may include a content processing module configured to enable a user to one or more of create and edit content, where portions of the content are hierarchically organized in containers. The content service may also include a sharing module configured to receive a request to share a portion of the content from the user; enable sharing of the portion of the content with another user regardless of a level of container that contains the portion of the content within the organizational hierarchy; and provide a sharing status of the portions of content to the user and another sharing status of the shared portion of content to the other user.

According to other examples, the sharing module may be further configured to provide one or more sharing permissions associated with the portion of the content to the other user. The one or more sharing permissions may be user-defined, content service default, or inherited from a higher level container that contains a container associated with the portion of the content. The sharing module may also enable assignment of sharing permissions to another portion of the content that are distinct from sharing permissions of a higher level container that includes the other portion of the content. The sharing permissions may include one of more of copy permission, move permission, edit permission, save permission, and create new content permission.

According to further examples, the sharing module may be configured to provide the sharing status through a share vector that represents the sharing status for shared levels of containers over time. The content processing module may be further configured to provide for display a user interface that enables the user to organize containers of content based on one or more of user-defined and default categories. The sharing module may also control one or more indicators displayed on the user interface, the one or more indicators representing sharing status of containers and content within the containers. The one or more indicators may represent information associated with one or more of: whether a portion of content is shared, users with whom the portion of content is shared, sharing permissions given to the users, whether an entire container is shared, whether sub-containers with a container are shared, and a sharing history. The one or more indicators may employ one or more of a textual scheme, a graphic scheme, a color scheme, a highlighting scheme, and a shading scheme. The content may include one or more of textual data, graphic data, images, audio data, and video data.

According to other examples, a method for providing share permissions and organization of content with multiple levels of organizational hierarchy may be described. An example method may include enabling a user to one or more of create and edit content, where portions of the content are hierarchically organized in containers; receiving a request to share a portion of the content from the user; enabling sharing of the portion of the content with another user regardless of a level of container that contains the portion of the content within the organizational hierarchy, where one or more sharing permissions associated with the portion of the content are distinct from one or more sharing permissions of a higher level container that includes the portion of the content; and providing a sharing status of the portions of content to the user and another sharing status of the shared portion of content to the other user in form of share vectors that represent sharing status for shared levels of containers over time.

According to some examples, the method may also include enabling a share recipient to place a standalone portion of content into a container with different share permissions without the standalone portion of content inheriting the container's share permissions; if another portion of content is received through a share action with defined share permissions, saving the other portion of content within a container preserving the defined share permissions; and if the other portion of content is received through the share action without defined share permissions, saving the other portion of content as a private copy. The method may further include enabling the user to create a shared portion of content through a user interface that enables the user to organize containers of content based on one or more of user-defined and default categories.

According to further examples, a computer-readable memory device with instructions stored thereon for providing share permissions and organization of content with multiple levels of organizational hierarchy in a notebook application may be described. The instructions may include providing a user interface that enables a user to organize containers of content based on one or more of user-defined and default categories, where levels of containers include notebooks, sections, and pages; enabling the user to one or more of create and edit portions of content; receiving a request to share a portion of the content front the user; enabling sharing of the portion of the content with another user regardless of a level of container that contains the portion of the content within the organizational hierarchy, where one or more sharing permissions associated with the portion of the content are distinct from one or more sharing permissions of a higher level container that includes the portion of the content; and providing a sharing status of the portions of content to the user and another sharing status of the shared portion of content to the other user in form of share vectors that represent sharing status for shared levels of containers over time.

According to yet other examples, the portions of content may include one or more of a word processing document, a spreadsheet, a presentation document, an email, a text message, a graphic file, an ink entry, an audio file, a video file, and a communication recording. The instructions may further include displaying one or more indicators on the user interface in conjunction with representations of the containers, the indicators representing information associated with one or more of: whether a portion of content is shared, users with whom the portion of content is shared, sharing permissions given to the users, whether an entire container is shared, whether sub-containers with a container are shared, and a sharing history. The represented information may be displayed through a separate user interface upon one of clicking on an indicator and hovering over the indicator. The instructions may also include indicating one or more of whether a container includes sub-containers, whether contents of a container have same share permissions, and whether contents of a container are shared through the representations of the containers on the user interface.

According to some examples, a means for providing share permissions and organization of content with multiple levels of organizational hierarchy may be described. The means may include a means for enabling a user to one or more of create and edit content, where portions of the content are hierarchically organized in containers; a means for receiving a request to share a portion of the content from the user; a means for enabling sharing of the portion of the content with another user regardless of a level of container that contains the portion of the content within the organizational hierarchy, where one or more sharing permissions associated with the portion of the content are distinct from one or more sharing permissions of a higher level container that includes the portion of the content; and a means for providing a sharing status of the portions of content to the user and another sharing status of the shared portion of content to the other user in form of share vectors that represent sharing status for shared levels of containers over time.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server configured to provide share permissions and organization of content with multiple levels of organizational hierarchy, the server comprising:
   a memory configured to store instructions;
   a processor coupled to the memory, the processor configured to execute a content service, wherein the content service includes:
   a content processing module that, when executed by the processor, directs the server to:
   receive, from a first user, a content to be stored in one of a plurality of hierarchically organized containers, the containers comprising a notebook, wherein the content is one or more of created, edited, or organized by the first user; and
   a sharing module that, when executed by the processor, directs the server to:
   receive, from the first user, a request to share the content within the notebook;
   in response to receipt of the request, share the content with another user by granting a permission for one or more of editing or organizing the content, wherein the permission associated with the content is distinct from a second permission granted to the other user for a higher level container of the plurality of hierarchically organized containers that includes the container with the content;
   provide, to the first user, a first sharing status in a form of a first share vector representing a sharing status of each of the plurality of hierarchically organized containers, including the container with the content;
   provide, to the other user, a second sharing status in a form of a second share vector representing a sharing status of the container with the content;
   after granting the permission for the one or more of the editing or the organizing of the content to the other user, receive, from first user, a request to share the higher level container that includes the container with the content within the notebook;
   in response to receipt of the request to share the higher level container, grant the other user the second permission;
   provide, to the first user, an updated first sharing status in a form of a third share vector representing the sharing status of each of the plurality of hierarchically organized containers over time from the first share vector, including the higher level container with the content; and
   provide, to the other user, an updated second sharing status in a form of a fourth share vector representing the sharing status over time from the second share vector of both the container with the content and the higher level container with the content.

2. The server of claim 1, wherein the permission is one of user-defined, content service default, and inherited from the higher level container that contains the container associated with the content.

3. The server of claim 1, wherein the granted permission includes one or more of copy permission, move permission, edit permission, save permission, and create new content permission.

4. The server of claim 1, wherein the content processing module is further configured to provide for display a user interface that enables the user to organize containers of content based on one or more of user-defined and default categories.

5. The server of claim 4, wherein the sharing module is further configured to:
control one or more indicators displayed on the user interface, the one or more indicators representing sharing status of containers and content within the containers.

6. The server of claim 5, wherein the one or more indicators represent information associated with one or more of: whether the content is shared, users with whom the content is shared, sharing permissions given to the users, whether an entire container is shared, whether sub-containers with a container are shared, and a sharing history.

7. The server of claim 5, wherein the one or more indicators employ one or more of a textual scheme, a graphic scheme, a color scheme, a highlighting scheme, and a shading scheme.

8. The server of claim 1, wherein the content includes one or more of textual data, graphic data, images, audio data, and video data.

9. A method for providing share permissions and organization of content with multiple levels of organizational hierarchy, the method comprising:
at a content processing module executed on a computing device:
receiving, from a first user, a content to be stored in one of a plurality of hierarchically organized containers, the containers comprising a notebook, wherein the content is one or more of created, edited, or organized by the first user; and
at a sharing module executed on the computing device:
receiving, from the first user, a request to share the content within the notebook;
in response to receipt of the request, sharing the content with another user by granting a permission for one or more of editing or organizing the content, wherein the permission associated with the content is distinct from a second permission granted to the other user for a higher level container that includes the container with the content;
providing, to the first user, a first sharing status in a form of a first share vector representing a sharing status of each of the plurality of hierarchically organized containers over time;
providing, to the other user, a second sharing status in a form of a second share vector representing a sharing status of the container with the content over time;
after granting the permission for the one or more of the editing or the organizing of the content to the other user, receiving, from the first user, a request to share the higher level container that includes the container with the content within the notebook;
in response to receipt of the request to share the higher level container, granting the other user the second permission;
providing, to the first user, an updated first sharing status in a form of a third share vector representing the sharing status of each of the plurality of hierarchically organized containers over time from the first share vector, including the higher level container with the content; and
providing, to the other user, an updated second sharing status in a form of a fourth share vector representing the sharing status over time from the second share vector of both the container with the content and the higher level container with the content.

10. The method of claim 9, further comprising:
at the sharing module executed on the computing device:
enabling a share recipient to place a portion of the content into a lower level container with different permissions without the portion of content inheriting the container's permissions.

11. The method of claim 9, further comprising:
at the content processing module executed on the computing device:
if another content is received through a share action with a defined permission, saving the other content within a container such that the defined permission is preserved; and
if the other content is received through the share action without the defined permission, saving the other content as a private copy.

12. The method of claim 9, further comprising:
at the content processing module executed on the computing device:
organizing containers of content based on one or more of user-defined and default categories through a user interface.

13. A computer-readable memory device with instructions stored thereon for providing share permissions and organization of content with multiple levels of organizational hierarchy in a notebook application, the instructions comprising:
a content processing module, when executed on a computing device:
receiving, from first a user, a content to be stored in one of a plurality of hierarchically organized containers, wherein the content is one or more of created, edited, or organized by the first user; and
providing a user interface that enables the user to organize containers of the content based on one or more of user-defined and default categories, wherein levels of containers include notebooks, sections, and pages; and
a sharing module, when executed on the computing device:
receiving, from the first user, a request to share the content within the notebook from the first user;
in response to receipt of the request, sharing the content with another user by granting a permission for one or more of editing or organizing the content, wherein the permission associated with the content is distinct from a second permission for a higher level container of the plurality of hierarchically organized containers that includes the container with the content;
providing, to the first user, a first sharing status in a form of a first share vector representing a sharing status of each of the plurality of hierarchically organized containers, including the container with the content over time; and
providing, to the other user, a second sharing status in a form of a second share vector representing a sharing status of the container with the content over time;
after granting the permission for the one or more of the editing or the organizing of the content to the other user, receiving, from the first user, a request to share the higher level container that includes the container with the content within the notebook;
in response to receipt of the request to share the higher level container, granting the other user the second permission;

providing, to the first user, an updated first sharing status in a form of a third share vector representing the sharing status of each of the plurality of hierarchically organized containers over time from the first share vector, including the higher level container with the content; and providing, to the other user, an updated second sharing status in a form of a fourth share vector representing the sharing status over time from the second share vector of both the container with the content and the higher level container with the content.

14. The computer-readable memory device of claim 13, wherein the content includes one or more of a word processing document, a spreadsheet, a presentation document, an email, a text message, a graphic file, an ink entry, an audio file, a video file, and a communication recording.

15. The computer-readable memory device of claim 13, wherein the instructions further comprise:

at the sharing module executed on the computing device:

displaying one or more indicators on the user interface in conjunction with representations of the containers, the indicators representing information associated with one or more of: whether the content is shared, users with whom the content is shared, permissions granted to the users, whether an entire container is shared, whether sub-containers within a container are shared, and a sharing history.

16. The computer-readable memory device of claim 15, wherein the represented information is displayed through a separate user interface upon one of clicking on an indicator and hovering over the indicator.

17. The computer-readable memory device of claim 15, wherein the instructions further comprise:

at the sharing module executed on the computing device:

indicating one or more of whether a container includes sub-containers, whether contents of a container have similar share permissions, and whether the contents of the container are shared through the representations of the containers on the user interface.

\* \* \* \* \*